(12) United States Patent
Kosecoff (10) Patent No.: US 11,693,471 B2
(45) Date of Patent: Jul. 4, 2023

(54) PERSONAL POLLUTION SENSING DEVICE WITH EXTENDED BATTERY LIFE

(71) Applicant: L'Oreal, Paris (FR)

(72) Inventor: David B. Kosecoff, San Francisco, CA (US)

(73) Assignee: L'Oreal, Paris (FR)

( * ) Notice: Subject to any disclaimer, the term of this patent is extended or adjusted under 35 U.S.C. 154(b) by 22 days.

(21) Appl. No.: 17/038,303

(22) Filed: Sep. 30, 2020

(65) Prior Publication Data

US 2022/0100251 A1    Mar. 31, 2022

(51) Int. Cl.
| G06F 1/00 | (2006.01) |
| G06F 1/3215 | (2019.01) |
| G06F 1/3287 | (2019.01) |
| G06F 1/16 | (2006.01) |

(52) U.S. Cl.
CPC ............ *G06F 1/3215* (2013.01); *G06F 1/163* (2013.01); *G06F 1/3287* (2013.01)

(58) Field of Classification Search
CPC ...... G06F 1/3215; G06F 1/3287; G06F 1/163; G06F 1/1626; G06F 1/3206; G06F 1/325
See application file for complete search history.

(56) References Cited

U.S. PATENT DOCUMENTS

| 9,131,462 | B1 * | 9/2015 | Verghese | ............... G01S 5/0027 |
| 10,469,931 | B2 | 11/2019 | Martin et al. | |
| 11,079,913 | B1 * | 8/2021 | Kim | ................... H04M 1/72433 |
| 2012/0324829 | A1 * | 12/2012 | Omura | ..................... G07F 11/44 |
| | | | | 53/147 |
| 2014/0187264 | A1 * | 7/2014 | Min | ...................... H04W 48/16 |
| | | | | 455/456.2 |
| 2016/0066848 | A1 | 3/2016 | Klosinski, Jr. et al. | |
| 2016/0080888 | A1 * | 3/2016 | Kreitzer | ................... H04B 7/26 |
| | | | | 455/39 |
| 2016/0318476 | A1 * | 11/2016 | Cogill | ..................... B60R 25/30 |
| 2018/0325422 | A1 * | 11/2018 | Sokol | ........................ A62B 7/10 |
| 2019/0140906 | A1 * | 5/2019 | Furuichi | ................. G06F 16/27 |
| 2019/0289142 | A1 * | 9/2019 | Takeshita | ........... H04N 1/00323 |
| 2021/0096119 | A1 * | 4/2021 | Qu | ........................... H04L 67/52 |

FOREIGN PATENT DOCUMENTS

WO    2017/136336 A1    8/2017

\* cited by examiner

*Primary Examiner* — Zhipeng Wang
(74) *Attorney, Agent, or Firm* — Christensen O'Connor; Johnson Kindness PLLC (57) ABSTRACT

A computer system and the computer-implemented method of extending the battery life of a personal wearable sensing device, the method comprises determining a current location of the sensing device; determining locations of publicly accessible environmental monitors; determining whether the current location is within a proximity limit to a publicly accessible environmental monitor; and receiving information from the publicly accessible environmental monitor when the current location is within the proximity limit to the publicly accessible environmental monitor to save battery life of the sensing device.

21 Claims, 5 Drawing Sheets

PERSONAL POLLUTION SENSING DEVICE WITH EXTENDED BATTERY LIFE

SUMMARY

Personal, portable, and wearable environmental sensing devices can measure harmful ultraviolet exposure and air pollutants and warn a user of over exposure to either. Sensing devices that are powered by a battery, whether rechargeable or not, are limited by the battery life. In one embodiment, a computer implemented method extends the battery life of personal wearable sensing devices. In one embodiment, the battery life of a personal pollution sensing device is extended by contextually enabling and disabling the one or more sensors on the sensing device based on determining the user (and sensing device) proximity to Federal-grade air quality monitors via a global positioning system, for example. In one embodiment, the application receives the environmental monitor readings, such as air quality or harmful light readings, from online publicly accessible sources instead of the sensing device.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In one embodiment, a computer-implemented method uses environmental monitor information, such as air quality and light readings, from online publicly accessible sources when in proximity to the monitors and uses sensors from a wearable device when not in proximity. The environmental sensors inside a personal or wearable pollution sensing device can consume a great deal of power, limiting the device's usage time off a single battery charge if they're left on continuously. However, in many circumstances, especially in urban environments, the user wearing the sensing device is in some proximity to a Federal-grade air quality monitor that reports highly accurate data to weather stations and other public outlets. This environmental information is publicly available through computer networks. In one embodiment, it is not necessary for the personal sensing device, or parts of the personal sensing device, to be enabled or powered, as equivalent information can be gathered online from these publicly accessible sources of environmental information.

In one embodiment, the method extends the personal sensing device's battery lifetime, thereby creating a better user experience.

In one embodiment, a computer-implemented method (Application or "App") is configured on a mobile computing device, such as a smart phone, tablet, laptop, and the like, which connects via wireless technology to a computer network, such as the Internet. The method has instructions on determining the present location of the user who is wearing the personal environmental sensing device. The mobile computing device compares the user's and sensing device location against locations of Federal grade publicly accessible environmental monitors which data is made publicly-available over public computer networks. If the mobile computing device determines that the user location and sensing device is within a certain radius of the public environmental monitor or within of a relative dispersion zone (calculated from online weather station data), the App transmits a signal to the user's personal sensing device to disable some or all of its sensors. Once the App determines that the user is outside a certain radius of the monitor or outside of a relative dispersion zone, the App transmits a signal to the user's personal sensing device to re-enable some or all of its sensors.

High levels of air pollutants indoors or outdoors can detrimentally affect one's health. Therefore, there are personal wearable sensing devices that measure one or more levels of a pollutant and transmit the data to a mobile computing device carried by a user. Various battery-powered sensing devices exist for measuring different types of light radiation (i.e. UV-A, UV-B, Blue HEV, IR) and air-borne pollutants (i.e., CO, $CO_2$, $NO_2$, NOx, $SO_2$, $O_3$, PM2.5, PM10, VOC, heavy metals, radiation) as well as atmospheric conditions, such as temperature and humidity. The amount of light radiation and air-borne pollutants at given locations is also available for downloading from various publicly accessible sources on the Internet.

Existing battery-powered sensing devices have dedicated sensors that measure the amount of pollutant in any environment and transmit the data via a wireless technology to a smart device (e.g., a mobile phone). The smart phone can receive, process, and display the data in a manner that is helpful to the user.

This disclosure relates to a computer system and a computer-implemented method that controls the power usage of a sensing device, wherein the sensing device is in communication with a mobile computing device.

Figure 1:
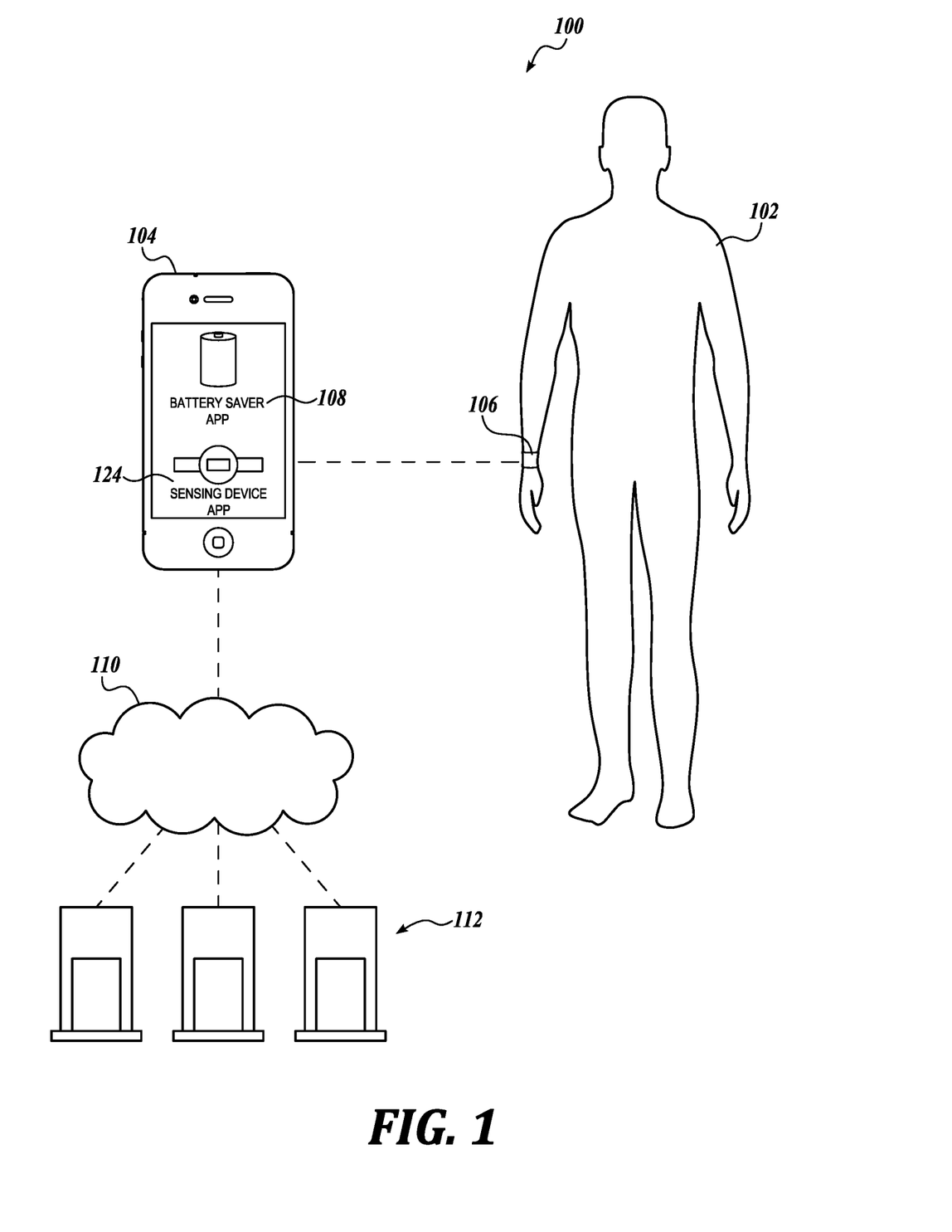
FIG. 1 a schematic diagram that illustrates one embodiment of a system for extending battery life of a battery-powered sensing device.

FIG. 1 is a schematic diagram that illustrates a non-limiting example embodiment of a system 100 for controlling the power usage of a personal or wearable sensing device 106 through communication with a mobile computing device 104. The sensing device 106 is battery-powered and has one or more sensors for measuring environmental quality, including, but not limited to pollutants. The mobile computing device 104 has a Sensing Device Application engine 124 that receives, processes and displays the information received from the sensing device 106 in a form that is helpful to the user 102. In one embodiment, the mobile computing device 104 has a Battery Saver Application engine 108 that is in addition to or a modification of the Sensing Device Application engine 124. The Battery Saver Application engine 108 is used to reduce power consumption, thus, extending the battery life of the sensing device 106.

In the system 100, the user 102 interacts with the mobile computing device 104. In one embodiment, the mobile computing device 104 may be used to receive exposure information of one or more pollutants from the personal sensing device 106 worn by the user 102. Additionally or alternatively, the information may come from one or more publicly accessible sources on the Internet, such as online sources that report the air quality and harmful light levels for a particular location, for example, online sites can provide the amount of ozone (O3), particulate matter (PM), sulfur dioxide (SO2), nitrogen dioxide (NO2) and nitrogen oxides (NOx), UVA, and UVB.

The mobile computing device 104 is capable of performing the computer-implemented method Applications 108 and 124. The user 102 may start the computer-implemented methods by touching the icons 124 and 108 on a touch-sensitive display of the mobile computing device 104. Alternatively, the Battery Saver Application engine 108 is automatically started and runs whenever the Sensing Device Application engine 124 is started or running. The computer-implemented method Application engine 108 is further described in connection with FIG. 5.

In one embodiment, the mobile computing device 104 is connected to a remote server computer system 112 comprised of one or more server computers via a network, such as the Internet 110. The network may include any suitable networking technology, including but not limited to a wireless communication technology (including but not limited to Wi-Fi, WiMAX, Bluetooth, 2G, 3G, 4G, 5G, and LTE), a wired communication technology (including but not limited to Ethernet, USB, and FireWire), or combinations thereof.

Figure 2:
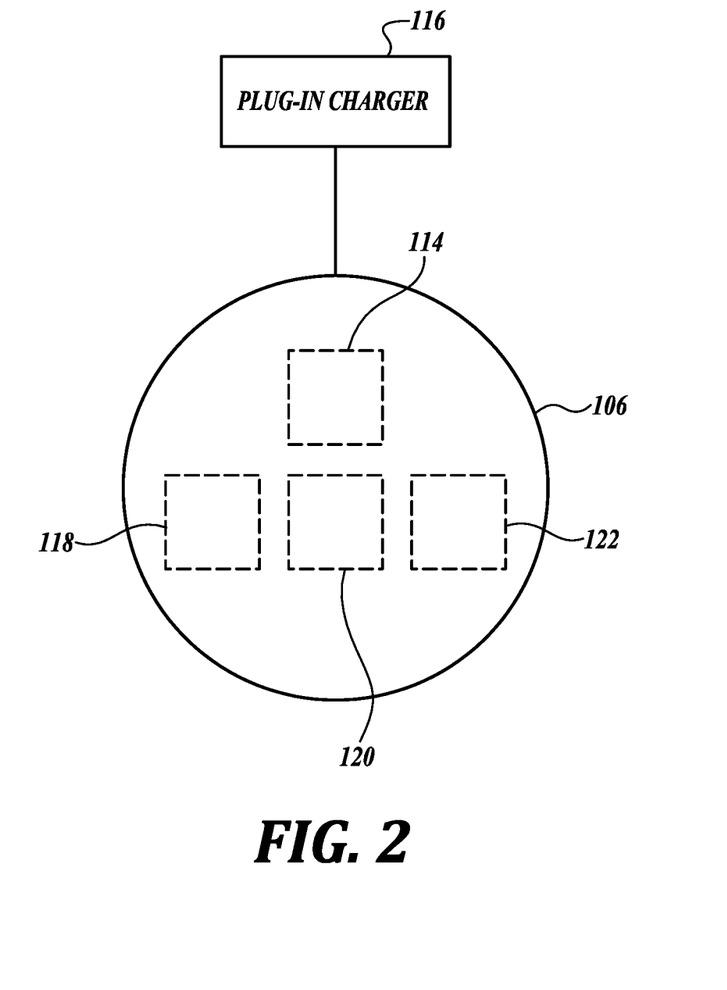
FIG. 2 is a schematic diagram that illustrates a battery-powered sensing device having one or more environmental monitoring sensors.

FIG. 2 is a schematic illustration of a sensing device 106 according to one embodiment. The sensing device 106 is a battery-powered device. The battery 114 is either a rechargeable battery, in which case, the battery 114 can be recharged by plugging the sensing device 106 to an AC outlet via a plug-in charger 116, or the battery 114 is replaced with a new battery. The sensing device 106 includes one or more sensors 118, 120, and 122 being powered by the battery 114. In one embodiment, sensors 118, 120, and 122 measure one or more environmental parameters, including light radiation (i.e. UV-A, UV-B, Blue HEV, IR) and air-borne pollutants (i.e., CO, CO2, NO2, NOx, SO2, O3, PM2.5, PM10, VOC, heavy metals, radiation) as well as atmospheric conditions, such as temperature and humidity. The sensing device 106 includes circuitry configured to selectively switch the power on and off from the battery 114 to the sensors 118, 120, 122. The sensing device also includes wireless communication to communicate with the mobile computing device 104. The instructions when to switch the power on and off to the sensors 118, 120, 122 of the device 106 are stored in the mobile computing device 104 which sends the instructions via wireless signals.

Figure 3:
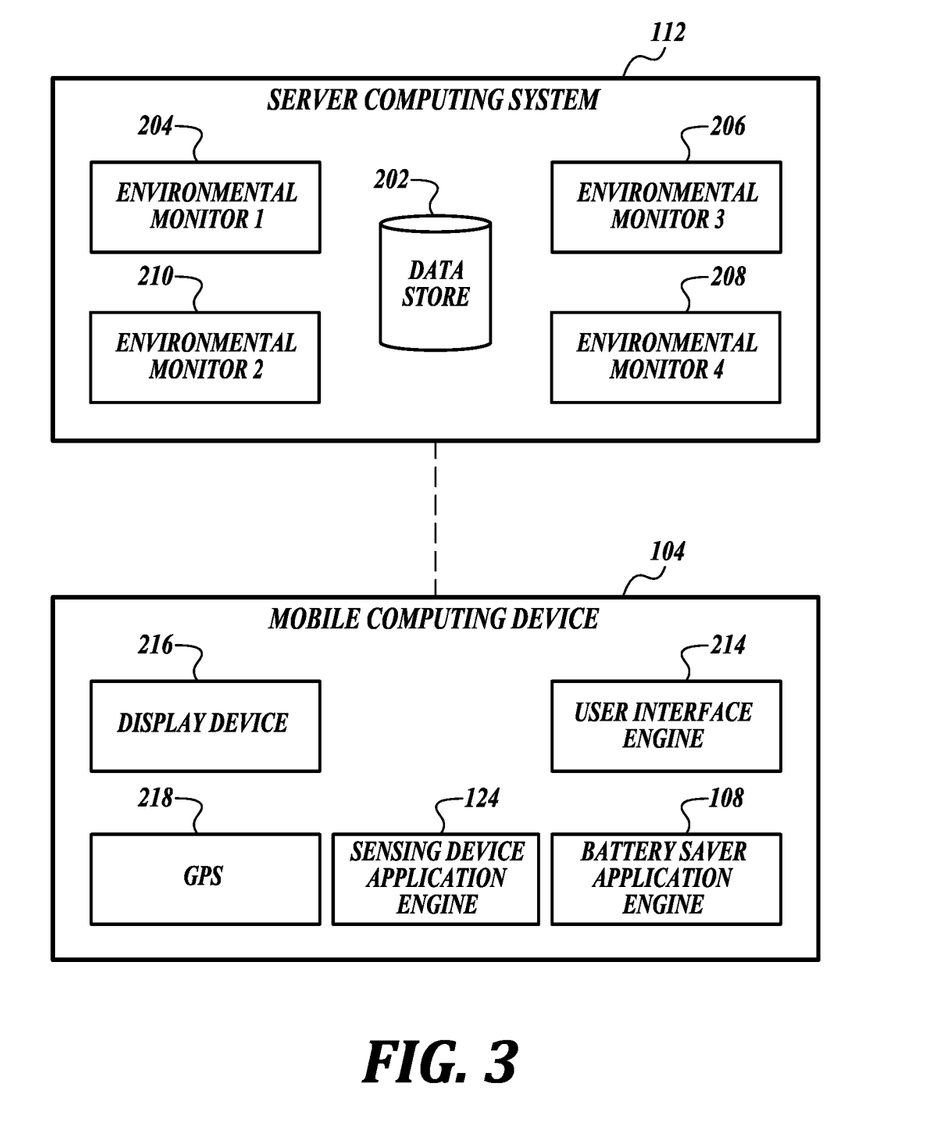
FIG. 3 is a block diagram that illustrates one embodiment of a system that includes a computing device and a server computing device.

FIG. 3 is a block diagram that illustrates a non-limiting example embodiment of a system that includes the mobile computing device 104 and a server computing system 112. In one embodiment, the mobile computing device 104 is a smart phone. In one embodiment, the mobile computing device 104 is any other type of computing device having the illustrated components, including but not limited to a tablet computing device or a laptop computing device. In one embodiment, the illustrated components of the mobile computing device 104 are within a single housing. In one embodiment, the illustrated components of the mobile computing device 104 are in separate housings that are communicatively coupled through wired or wireless connections. The mobile computing device 104 also includes other components that are not illustrated, including but not limited to one or more processors, a non-transitory computer-readable medium, a power source, and one or more communication interfaces.

In one embodiment, the server computing system 112 includes one or more computing devices that each include one or more processors, non-transitory computer-readable media, and network communication interfaces that are collectively configured to provide the illustrated components. In one embodiment, the one or more computing devices that make up the server computing system 112 may be rack-mount computing devices, desktop computing devices, or computing devices of a cloud computing service.

The server computing system 112 includes the collection of computing devices that acquire and store environmental information from remote environmental monitors 204, 206, 208, 210 placed at various locations, and make that information available on public sources. A reliable source of environmental information is the air quality monitoring system maintained by the Environmental Protection Agency in the United States. For example, such information is publicly available at https://www.epa.gov/outdoor-air-quality-data/interactive-map-air-quality-monitors.

In one embodiment, the server computing system 112 includes and communicates with more than one environmental monitors 204, 206, 208, and 210, whose information is publicly accessible. In one embodiment, the server computing system 112 includes a data store 202. In one embodiment, the data store 202 is configured to store records, such as location of and the environmental information coming from the more than one environmental monitors, and affected dispersion zone. The data store 202 may include all the locations where environmental monitors are in operation, the dispersion zones, and the historical records of the environmental monitors and other related information.

As shown, the mobile computing device 104 includes, at least, a display device 216, a Sensing Device Application engine 212, a Battery Saver Application engine 108, and a user interface engine 214.

In one embodiment, the mobile computing device 104 is configured to connect to the server computing system 112 in a cloud computing environment. In one embodiment, the mobile computing device 104 is configured to retrieve the environmental information from publicly accessible sources which receive the environmental information from the remote environmental monitors 204, 206, 208, and 210.

In one embodiment, the Sensing Device Application engine 212 is configured to receive and process the information acquired by the personal sensing device 106 to determine pollutant levels and exposure times of the user. In one embodiment, the Sensing Device Application engine 212 is configured to process the data acquired from the publicly accessible sources having the amount of air pollutants at a given location. In one embodiment, the Sensing Device Application engine 212 is configured to both process the information acquired by the sensing device 106 and information acquired through publicly accessible sources from the environmental monitors 204, 206, 208, 210.

In one embodiment, the Sensing Device Application engine 212 is configured to calculate the amount of pollutant exposure on a minute, hourly, daily, weekly, monthly, yearly, or lifetime basis. In one embodiment, the Sensing Device Application 212 calculates the pollutant levels by keeping track of a user's location by global positioning system (GPS) coordinates.

In one embodiment, the Sensing Device Application engine 212 is configured to calculate the user's exposure to one or more pollutants over time, and compare the amount of exposure to the target exposure limits on a minute, hourly, daily, weekly, monthly, yearly, or lifetime basis.

In one embodiment, the mobile computing device 104 includes the Battery Saver Application engine 108. The Battery Saver Application engine 108 is incorporated into the Sensing Device Application engine 124 or the Battery Saver Application engine is a standalone engine that is called by the Sensing Device Application engine 124. In either case, the Battery Saver Application engine 108 includes an "engine" configured to determine the current user 102 and sensing device 106 location via the GPS 218. In one embodiment, the sensing device 106 is worn by the user 102, the purpose of which is to inform the user of the air quality that the same user is being exposed to. When referring to user 102 location it is understood that the location corresponds to the sensing device 106 location as well. The Battery Saver Application engine 108 is further configured to compare the current user location to the locations saved in the data store of an environmental monitor that is in proximity of the current user location, and whose information is publicly accessible. When the Battery Saver Application engine 102 determines one or more environmental monitor locations are within the proximity of the current user location, the Battery Saver Application engine sends a signal either through the Sensing Device Application engine 124, or independently from the Sensing Device Application engine 124, that is received by the sensing device 106. The signal conveys instructions to the sensing device 106 to disable one or more of the sensors 118, 120, 122. Disabling includes lowering the power consumption from the sensor and associated systems such that the sensor and associated systems use less power, thus, extending the battery 114 life. The sensor that is disabled is that sensor that collects information that is similar to the information that can be acquired from the environmental monitors through publicly available sources which the Battery Saver Application engine 102 determines is in proximity to the current user location.

In one embodiment, the Battery Saver Application engine 108 sends a signal to the Sensing Device Application engine 124, which conveys instructions to stop using environmental information from the disabled sensor and start using the environmental information from the environmental monitor that is in proximity to the current user location.

In one embodiment, as the user moves from location to location, the Battery Saver Application engine 108 can give further instructions to enable the formerly disabled sensor, and disable a different sensor, while also sending instructions to the Sensing Device Application engine 124 when to use the information from the sensors of the sensing device 106 and when to use information from the environmental monitors that come into proximity with the current user location.

The display device 216 is an LED display, an OLED display, or another type of display for presenting a user interface. The display device 216 may be combined with or include a touch-sensitive layer, such that a user 102 may interact with a user interface presented on the display device 216 by touching the display. A separate user interface device, including but not limited to a mouse, a keyboard, or a stylus, may be used to interact with a user interface presented on the display device 216.

The user interface engine 214 is configured to present a user interface on the display device 216 when opening the Sensing Device Application engine 124. The Sensing Device Application engine 124 will cause the user interface engine 214 to display a plurality of user interfaces on the display device 216 relating to the information received from the sensing device 106 or from the publicly available sources of the remote environmental monitors on the network. The Sensing Device Application engine 124 can display pollutant data in a useful manner, such as current pollutant levels, or accumulated pollutant levels over any period of time. In one embodiment, the Sensing Device Application engine 124 can also display the battery charge status of the battery 114 in the sensing device 106.

In one embodiment, the Sensing Device Application engine 124 can display whether any of the sensors on the sensing device 106 are disabled, as described herein, and whether the information being displayed comes from a publicly accessible source and the location of the environmental monitor. In one embodiment, the user 108 can override the disabling of a sensor by the Battery Saver Application engine 108, so that the user selects to receive information from the sensing device 106, as opposed to receiving information from a remote, but proximate, environmental monitor location. In one embodiment, the user can also override the proximity restrictions on selecting the remote environmental monitor, such that the user receives environmental information from the remote environmental monitor despite such monitor being out of the proximate area of the user's current location. In one embodiment, the user can change the limits of the proximity restrictions on using remote information versus information from the sensing device 106. This can result in even greater power savings and extended battery life, because the number of remote environmental monitor locations is increased. In one embodiment, the proximity limit is known as the dispersion zone. A dispersion zone is a radius or a plume over which a pollutant is being distributed. The dispersion zone can take into consideration the wind direction and wind velocity and user's elevation to adjust the proximity limit, and also to determine whether or not the use is within the dispersion zone of an environmental monitor. For example, in one embodiment, a proximity limit will exclude an environmental monitor if such environmental monitor is downwind from the user, and include an environmental monitor if such environmental monitor is upwind from the user. In the former case, the user is not within the plume or dispersion zone of the pollutant being measured by the environmental monitor, while in the latter case, the user is within the plume or dispersion zone of the pollutant being measure by the environmental monitor. The dispersion zones of pollutants are also publicly accessible from online sources, such as weather stations.

"Engine" refers to logic embodied in hardware or software instructions, which can be written in a programming language, such as C, C++, COBOL, JAVA™, PHP, Perl, HTML, CSS, JavaScript, VBScript, ASPX, Microsoft.NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by the mobile computing device 104.

"Data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
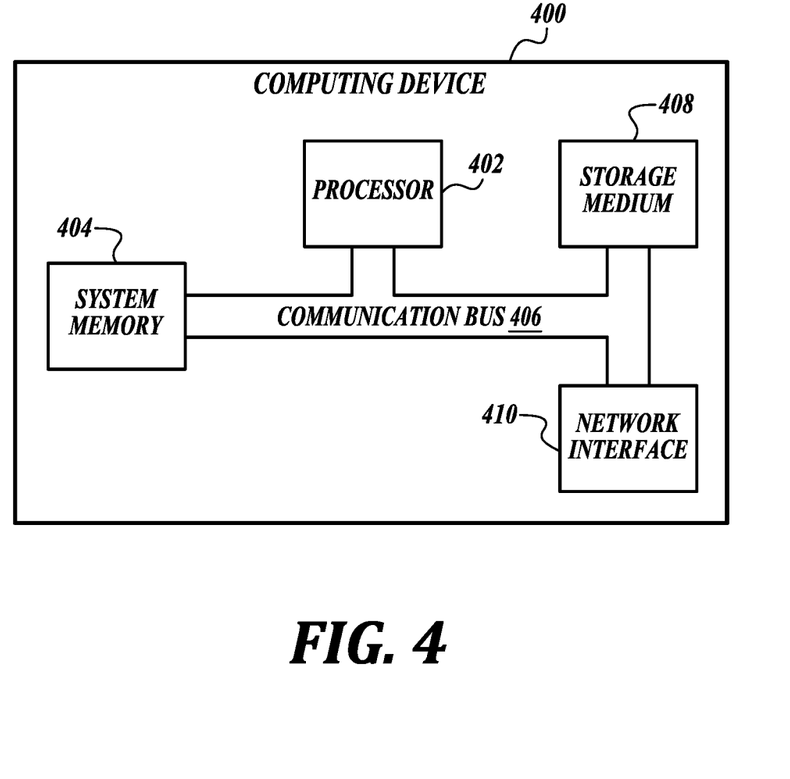
FIG. 4 is a block diagram that illustrates one embodiment of a computing device.

FIG. 4 is a block diagram that illustrates aspects of an exemplary computing device 400 appropriate for use as a mobile computing device 104 of the present disclosure. While multiple different types of computing devices were discussed above, the exemplary computing device 400 describes various elements that are common to many different types of computing devices. While FIG. 4 is described with reference to a mobile computing device, the description below is applicable to servers, personal computers, mobile phones, smart phones, tablet computers, embedded computing devices, and other devices that may be used to implement portions of embodiments of the present disclosure.

In its most basic configuration, the computing device 400 includes at least one processor 402 and a system memory 404 connected by a communication bus 406. Depending on the exact configuration and type of device, the system memory 404 may be volatile or nonvolatile memory, such as read only memory ("ROM"), random access memory ("RAM"), EEPROM, flash memory, or similar memory technology. Those of ordinary skill in the art and others will recognize that system memory 404 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 includes a network interface 410 comprising one or more components for communicating with other devices over a network. The computing device 400 accesses basic services that utilize the network interface 410 to perform communications using common network protocols. The network interface 410 also includes a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 410 illustrated in FIG. 4 represents one or more wireless interfaces or physical communication interfaces described and illustrated above with respect to particular components of the computing device 400.

In the embodiment depicted in FIG. 4, the computing device 400 also includes a storage medium 408. However, services may be accessed using a computing device that does not include means for persisting data to a local storage medium. Therefore, the storage medium 408 depicted in FIG. 4 is optional. In any event, the storage medium 408 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 404 and storage medium 408 depicted in FIG. 4 are merely examples of computer-readable media.

Suitable implementations of computing devices that include a processor 402, system memory 404, communication bus 406, storage medium 408, and network interface 410 are known and commercially available. For ease of illustration and because it is not important for an understanding of the claimed subject matter, FIG. 4 does not show some of the typical components of many computing devices. In this regard, the computing device 400 includes an input device, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 includes an output device such as a display, speakers, printer, etc. Since these devices are well known in the art, they are not illustrated or described further herein.

Figure 5:
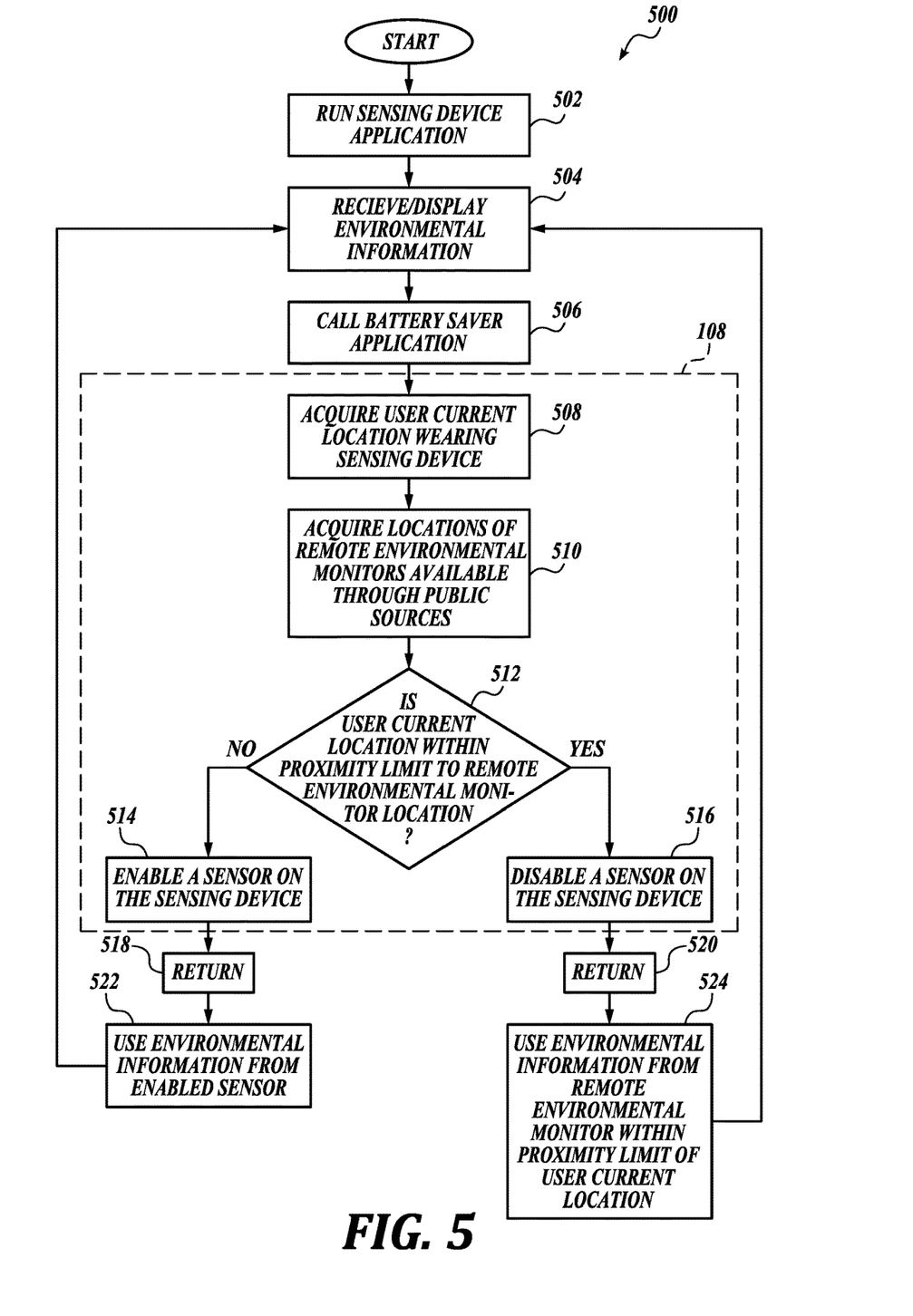
FIG. 5 is a flowchart that illustrates a one embodiment of a method of extending battery life of the battery-powered sensing device.

FIG. 5 is a flowchart that illustrates a non-limiting example embodiment of a computer-implemented method of extending battery life of the sensing device 106. The method 500 may be implemented, in one example, by the mobile computing device 104 and the server computing system 112.

The computer-implemented method 500 may start by clicking on the icon for the Sensing Device Application engine 124 on the display of the mobile computing device 104. In block 502, the Sensing Device Application engine 124 starts up and enters block 504.

In block 504, the Sensing Device Application engine 124 communicates with the sensing device 106, and processes the information acquired from the sensing device 160 and displays the information in any manner to the user 102 via the mobile computing device 104.

From block 504, the Sensing Device Application engine 124 proceeds to block 506. In block 506, the Sensing Device Application engine 124 calls the Battery Saver Application engine 108 to start. In one embodiment, the call to start the Battery Saver Application engine 108 is a choice made by the user 102 by selecting a battery saver feature. In one embodiment, the call to start the Battery Saver Application engine 108 is automatic based on battery status. For example, the Battery Saver Application engine 108 is started when the battery charge status is below 50% charged. In one embodiment, the call to start the Battery Saver Application engine 108 is automatic whenever the Sensing Device Application engine 124 is started. In one embodiment, a notification to the user 102 can be presented via the mobile computing device 104 that the sensing device 106 is operating in battery saver mode, and the user 102 is given the option to stop the Battery Saver Application engine 108 from running.

Once the Battery Saver Application 108 is running, in block 508, the Battery Saver Application engine 108 acquires the current location of the user 102 who is wearing the sensing device 106 via the GPS 218 on the computing device 104. Current location of the user 102 can be in longitude and latitude as well as elevation. From block 508, the Battery Saver Application engine 108 enters block 510.

In block 510, the Battery Saver Application engine 108 acquires the locations of remote publicly accessible environmental monitors. These locations can be available through the data store 202 on the server computing system 112. From block 510, the Battery Saver Application engine 108 enters block 512.

In block 512, the Battery Saver Application engine 108 compares the current location of the user 102 to the locations of the remote environmental monitors. The comparison is to determine whether the current location of the user is within a proximity limit to one or more remote environmental monitor locations. In one embodiment, the proximity limit is set automatically by the Battery Saver Application engine 108. In one embodiment, the proximity limit is set by the user 102. For example, the user can decide to compare all remote environmental monitors within a certain radius of the current location or within the same geographic area, such as postal code. In one embodiment, the proximity limit is defined by a dispersion zone. In one embodiment, a dispersion zone is modeled from factors, such as wind direction and wind speed. In one embodiment, a dispersion zone is a geographic area where a pollutant is expected to be a certain concentration within the boundaries of a dispersion zone. When the Battery Saver Application engine 108 determines there is a publicly accessible environmental monitor within the proximity limit, the Battery Saver Application engine 108 enters block 516. When the Battery Saver Application engine 108 determines there is not a publicly accessible environmental monitor within the proximity limit, the Battery Saver Application engine 108 enters block 514.

In block 516, the Battery Saver Application engine 108 disables one or more sensors that gather information, which information is information that can be acquired from the one or more publicly accessible environmental monitors that are within the proximity limit to the user's current location. In one embodiment, when there are two or more publicly accessible environmental monitors, the Battery Saver Application engine 108 can select the closest one. In one embodiment, when there are two or more publicly accessible environmental monitors, the Battery Saver Application engine 108 can use the average or median of the environmental readings. In one embodiment, before disabling a sensor on the sensing device 106, the Battery Saver Application engine 108 can verify that the information from the publicly accessible environmental monitor is accurate by comparing such information to the last information received from the sensing device 106. In one embodiment, disabling a sensor means to reduce the power consumption of the sensor, for example, turning off communications with the mobile computing device 104.

When the Battery Saver Application engine 108 confirms that the information from the publicly accessible environmental monitor at a location that is within the proximity limit of the user's current location, and has disabled the sensor, the method returns to the Sensing Device Application engine 124 at block 520, and the Sensing Device Application engine 124 retrieves and uses the environmental information from the publicly accessible environmental monitor within the proximity limit of the user's current location.

In block 514, the Battery Saver Application engine 108 determines the user's current location is outside of a proximity limit of a publicly accessible environmental monitor or dispersion zone. In block 514, the Battery Saver Application engine 108 does not disable any sensor on the sensing device 106, or if a previous sensor was disabled, the Battery Saver Application engine 108 now enables the sensor. From block 514, the method returns to the Sensing Device Application engine 124 in block 520, and the Sensing Device Application engine 124 uses the environmental information from the enabled sensor. In one embodiment, in block 514 when the user current location is not within the proximity limit to a remote environmental monitor location, the Battery Saver Application engine 108 uses a different method to extend battery life. In one embodiment, in block 514, for enabled sensors the Battery Saver Application engine 108 reduces the frequency of sample measurements of at least one sensor if a) a predetermined number of consecutive samples show similar or identical readings, be it a series of zero or non-zero values, and/or b) the user's GPS location does not change within a predetermined time window. In one embodiment, the frequency of sampling is reduced from about once a minute to about once every ten minutes. In one embodiment, similar readings or measurements means a reading does not deviate from the previous reading or an average or median reading by more than about 10%, about 20%, or about 30%. In one embodiment, if the user's GPS location does not change within about 10 minutes, the frequency of sampling is reduced. In one embodiment, the frequency of sampling is set by the user. In one embodiment, the allowable deviation to determine consecutive readings are similar is set by the user. In one embodiment, the predetermined time that the user is at the same GPS location is also set by the user. The above values are given only as representative.

Accordingly, the Battery Saver Application engine 108 can both reduce the power consumption and extend the battery life of the sensing device 106, both when the user's current location is within a proximity limit to publicly accessible environmental monitors, and when the user's current location is not within a proximity limit to publicly accessible environmental monitors.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of extending battery life of a sensing device, the method comprising:
    wearing a sensing device on a person, wherein the sensing device includes a battery and at least one air pollution sensor;
    determining, by a computing device, a current location of the sensing device;
    determining, by the computing device, locations of publicly accessible air pollution monitors;
    determining, by the computing device, whether the current location is within a proximity limit to a publicly accessible air pollution monitor;
    receiving, by the computing device, information from two or more of the publicly accessible air pollution monitors when the current location is within the proximity limit to the publicly accessible air pollution monitors to save battery life of the battery included in the sensing device, and using an average or median of the information from the two or more of the publicly accessible air pollution monitors; and reducing a frequency of sample measurements of a sensor on the sensing device based on the following conditions occurring:

a predetermined number of consecutive samples taken by the sensor show similar readings; and a user's location does not change within a predetermined time window, wherein the frequency of sampling is set by the user, a deviation to determine consecutive readings are similar is set by the user, and the predetermined time that the user is at the same location is set by the user.

2. The computer-implemented method of claim 1, further comprising disabling at least one air pollution sensor on the sensing device to extend the battery life.

3. The computer-implemented method of claim 1, wherein the sensing device senses the level of one or more pollutants, light radiation, or atmospheric conditions.

4. The computer-implemented method of claim 1, further comprising displaying information from the publicly available air pollution on the computing device.

5. The computer-implemented method of claim 1, wherein the computing device is a smart phone, a tablet computer, or a laptop computer.

6. The computer-implemented method of claim 1, wherein the computing device includes a global positioning system.

7. The computer-implemented method of claim 1, wherein the computing device provides a notification to select using a publicly accessible air pollution monitor in place of an air pollution sensor from the sensing device.

8. The computer-implemented method of claim 1, wherein the computing device provides a notification that information is from a publicly accessible air pollution monitor in place of a sensor from the sensing device.

9. A computing device configured to:
  determine a current location of the sensing device, wherein the sensing device includes a battery and at least one air pollution sensor;
  determine locations of publicly accessible air pollution monitors;
  determine whether the current location is within a proximity limit to a publicly accessible air pollution monitor; and
  receive information from the publicly accessible air pollution monitor when the current location is within the proximity limit to the publicly accessible air pollution monitor to save battery life of the battery included in the sensing device and use an average or median of the information from the two or more of the publicly accessible air pollution monitors; and
  reduce a frequency of sample measurements of a sensor on the sensing device based on the following conditions occurring:
  a predetermined number of consecutive samples taken by the sensor show similar readings; and
  a user's location does not change within a predetermined time window, wherein the frequency of sampling is set by the user, a deviation to determine consecutive readings are similar is set by the user, and the predetermined time that the user is at the same location is set by the user.

10. The computing device of claim 9, wherein the computing device is further configured to disable at least one air pollution sensor on the sensing device to extend the battery life.

11. The computing device of claim 9, wherein the sensing device senses the level of one or more pollutants, light radiation, or atmospheric conditions.

12. The computing device of claim 9, wherein the computing device is further configured to display information from the publicly available air pollution monitor on the computing device.

13. The computing device of claim 9, wherein the computing device is a smart phone, a tablet computer, or a laptop computer.

14. The computing device of claim 9, wherein the computing device includes a global positioning system.

15. The computing device of claim 9, wherein the computing device is further configured to provide a notification to select using a publicly accessible air pollution monitor in place of a sensor from the sensing device.

16. The computing device of claim 9, wherein the computing device is further configured to provide a notification that information displayed on the computing device is from a publicly accessible air pollution monitor in place of a sensor from the sensing device.

17. A system, comprising:
  a battery saver application engine including computational circuitry configured to:
    determine a current location of a sensing device, wherein the sensing device includes a battery and at least one air pollution sensor;
    determine locations of publicly accessible air pollution monitors;
    determine whether the current location is within a proximity limit to a publicly accessible air pollution monitor; and
  receive information from the publicly accessible air pollution monitor when the current location is within the proximity limit to the publicly accessible air pollution monitor to save battery life of the battery included in the sensing device and using an average or median of the information from the two or more of the publicly accessible air pollution monitors; and
  reduce a frequency of sample measurements of a sensor on the sensing device based on the following conditions occurring:
  a predetermined number of consecutive samples taken by the sensor show similar readings; and
  a user's location does not change within a predetermined time window, wherein the frequency of sampling is set by the user, a deviation to determine consecutive readings are similar is set by the user, and the predetermined time that the user is at the same location is set by the user.

18. The system of claim 17, wherein the battery saver application engine includes computational circuitry configured to further disable at least one air pollution sensor on the sensing device to extend the battery life.

19. The system of claim 17, further comprising a sensing device application engine including computational circuitry configured to display information from the publicly available air pollution monitor on the computing device.

20. The system of claim 17, wherein the battery saver application engine includes computational circuitry configured to provide a notification to select using a publicly accessible air pollution monitor in place of a sensor from the sensing device.

21. The system of claim 17, wherein the battery saver application engine includes computational circuitry configured to provide a notification that information is from a publicly accessible air pollution monitor in place of a sensor from the sensing device.

* * * * *